United States Patent
Cho et al.

(10) Patent No.: US 9,616,884 B1
(45) Date of Patent: Apr. 11, 2017

(54) APPARATUS AND METHOD FOR CONTROLLING HYBRID ELECTRIC VEHICLE INCLUDING DUAL CLUTCH TRANSMISSION

(71) Applicant: HYUNDAI MOTOR COMPANY, Seoul (KR)

(72) Inventors: Teh Hwan Cho, Anseong-si (KR); Kwonchae Chung, Seoul (KR); Chang Min Lee, Anyang-si (KR); Seunghan Lee, Uiwang-si (KR); Jungeol Song, Seoul (KR); Namil Choi, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/150,547

(22) Filed: May 10, 2016

(30) Foreign Application Priority Data

Dec. 11, 2015 (KR) .......................... 10-2015-0177485

(51) Int. Cl.
  *B60W 10/02* (2006.01)
  *B60W 10/113* (2012.01)
  (Continued)

(52) U.S. Cl.
  CPC ............ *B60W 20/40* (2013.01); *B60K 6/442* (2013.01); *B60K 6/547* (2013.01); *B60W 10/02* (2013.01); *B60W 10/08* (2013.01); *B60W 2510/0208* (2013.01); *B60W 2510/0638* (2013.01); *B60W 2510/081* (2013.01); *B60W 2510/1015* (2013.01); *B60W 2510/244* (2013.01); *B60W 2510/246* (2013.01); *B60W 2540/10* (2013.01); *B60W 2550/142* (2013.01); *B60W 2710/021* (2013.01); *B60W 2710/025* (2013.01); *B60W 2710/081* (2013.01); *B60Y 2200/92* (2013.01);
  (Continued)

(58) Field of Classification Search
  CPC .... B60W 10/02; B60W 10/08; B60W 10/113; B60W 20/40; F02N 11/00
  See application file for complete search history.

(56) References Cited

U.S. PATENT DOCUMENTS

2013/0247870 A1* 9/2013 Sauvlet .................... B60K 6/48
                                                     123/352

FOREIGN PATENT DOCUMENTS

JP        2013-071551 A    4/2013
JP        5506484          3/2014
(Continued)

*Primary Examiner* — Huan Le
(74) *Attorney, Agent, or Firm* — Brinks Gilson & Lione

(57) ABSTRACT

A method and an apparatus for controlling a hybrid electric vehicle including a dual clutch transmission are provided. A method for controlling a hybrid electric vehicle including a dual clutch transmission (DCT) may include: determining whether an engine start condition is satisfied in a state in which an engine is stopped; determining whether a slip control entry condition of a shift clutch of the DCT is satisfied when the engine start condition is satisfied; increasing a speed of a driving motor by slipping the shift clutch when the slip control entry condition is satisfied; determining whether a lock-up condition of an engine clutch is satisfied while increasing the speed of the driving motor; locking up the engine clutch when the lock-up condition of the engine clutch is satisfied; and increasing engagement force of the shift clutch when the engine clutch is locked up.

16 Claims, 10 Drawing Sheets

(51) Int. Cl.
*B60W 20/40* (2016.01)
*B60K 6/442* (2007.10)
*B60K 6/547* (2007.10)
*B60W 10/08* (2006.01)

(52) U.S. Cl.
CPC ... *B60Y 2300/182* (2013.01); *B60Y 2300/426* (2013.01); *B60Y 2300/43* (2013.01); *Y10S 903/93* (2013.01)

(56) References Cited

FOREIGN PATENT DOCUMENTS

| | | |
|---|---|---|
| JP | 2015-101205 | 6/2015 |
| KR | 10-2014-0073305 | 6/2014 |
| KR | 10-1519263 B1 | 5/2015 |
| KR | 10-1558769 B1 | 10/2015 |

\* cited by examiner

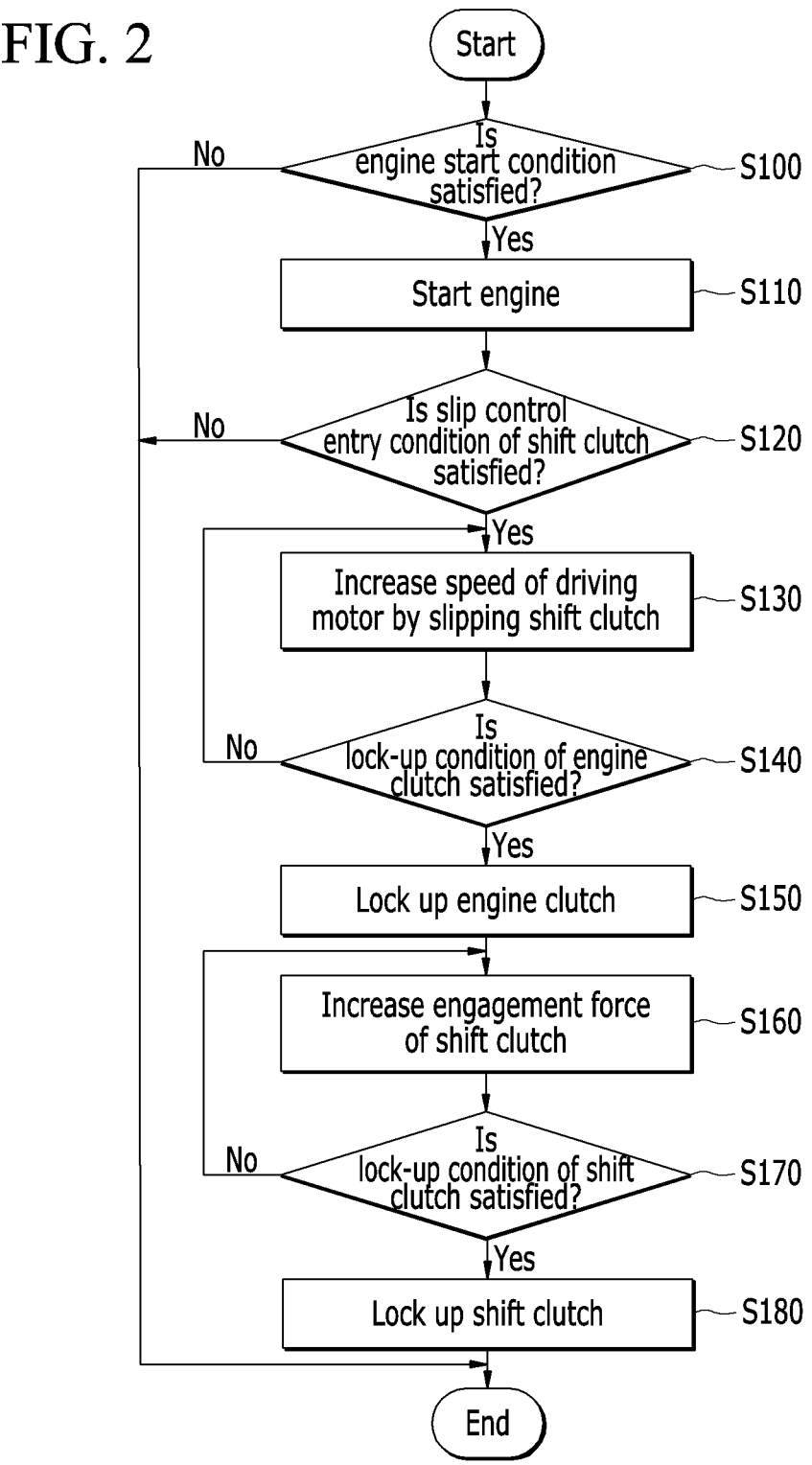

APPARATUS AND METHOD FOR CONTROLLING HYBRID ELECTRIC VEHICLE INCLUDING DUAL CLUTCH TRANSMISSION

CROSS-REFERENCE TO RELATED APPLICATION

This application claims priority to and the benefit of Korean Patent Application No. 10-2015-0177485, filed on Dec. 11, 2015, which is incorporated herein by reference in its entirety.

FIELD

The present disclosure relates to an apparatus and a method for controlling a hybrid electric vehicle. More particularly, the present disclosure relates to an apparatus and a method for controlling a hybrid electric vehicle including a dual clutch transmission.

BACKGROUND

The statements in this section merely provide background information related to the present disclosure and may not constitute prior art.

Environmentally-friendly techniques of vehicles are very important, and the survival of the future motor industry is dependent thereon. Vehicle makers are focusing on development of environmentally-friendly vehicles so as to meet environmental and fuel consumption regulations.

Some examples of applications of such future vehicle techniques are a hybrid electric vehicle (HEV) and a dual clutch transmission (DCT).

The DCT includes two clutches and a gear train applied to a manual transmission. The DCT selectively transmits torque output from a torque source (e.g., an engine or driving motor) to two input shafts by using two clutches, changes a speed by using the gear train, and outputs the changed torque.

Such a DCT is used to provide a compact transmission having five or more forward speed stages. Since two clutches and synchronizers are controlled by a controller, a manual shift maneuver is unnecessary for controlling the DCT. Therefore, the DCT is one type of automated manual transmission (AMT).

The hybrid electric vehicle uses an internal combustion engine and a battery power source together. In other words, the hybrid electric vehicle efficiently combines and uses torque of the internal combustion engine and torque of a driving motor. Since the hybrid electric vehicle uses both mechanical energy of the engine and electrical energy of the battery, uses desired operation regions of the engine and the motor, and recovers energy upon braking, fuel efficiency may be improved and energy may be efficiently used.

The hybrid electric vehicle provides driving in an electric vehicle (EV) mode in which only torque of the driving motor is used, a hybrid electric vehicle (HEV) mode in which torque of the engine is used as main torque and torque of the driving motor is used as auxiliary torque, and a regenerative braking mode in which braking and inertial energy are recovered through electrical power generation of the driving motor during braking of the vehicle or during deceleration of the vehicle by inertia to be charged in the battery.

In the method for controlling the hybrid electric vehicle according to the related art, when the EV mode is switched to the HEV mode (i.e., when the engine starts), after a speed of the engine is synchronized to a speed of the driving motor, drivability may be provided to inhibit or prevent engagement shock from occurring while torque is delivered between the engine and the motor which are different torque sources by engaging an engine clutch.

However, in a case where a position value of an accelerator pedal is very high or torque of the driving motor is limited, a time until the speed of the motor reaches the speed of the engine (i.e., a time in which torque of the engine is not used as driving torque of the hybrid electric vehicle) is increased, thereby deteriorating acceleration performance of the hybrid electric vehicle.

The above information disclosed in this Background section is only for enhancement of understanding of the background of the present disclosure and therefore it may contain information that does not form the prior art that is already known in this country to a person of ordinary skill in the art.

SUMMARY

The present disclosure provides an apparatus and a method for controlling a hybrid electric vehicle including a dual clutch transmission having advantages of reducing a time to engage an engine clutch and engagement shock by using slip control of a shift clutch of the dual clutch transmission.

A method for controlling a hybrid electric vehicle including a dual clutch transmission (DCT) according to an exemplary form of the present disclosure may include: determining whether an engine start condition is satisfied in a state in which an engine is stopped; determining whether a slip control entry condition of a shift clutch of the DCT is satisfied when the engine start condition is satisfied; increasing a speed of a driving motor by slipping the shift clutch when the slip control entry condition is satisfied; determining whether a lock-up condition of an engine clutch is satisfied while increasing the speed of the driving motor; locking up the engine clutch when the lock-up condition of the engine clutch is satisfied; and increasing engagement force of the shift clutch when the engine clutch is locked up.

The slip control entry condition may be satisfied when a position value of an accelerator pedal is greater than a predetermined position value and a state of charge (SOC) of a battery is less than a predetermined SOC.

The slip control entry condition may be satisfied when a position value of an accelerator pedal is greater than a predetermined position value and a temperature of a battery is less than a predetermined temperature.

The slip control entry condition may be satisfied when a position value of an accelerator pedal is greater than a predetermined position value and a gradient of a road is greater than a predetermined gradient.

In the increasing of the speed of the driving motor by slipping the shift clutch, a slip amount of the shift clutch may be determined based on a position value of an accelerator pedal.

The lock-up condition of the engine clutch may be satisfied when a difference value between a speed of the engine and the speed of the driving motor is less than a first predetermined value.

The engine clutch may be a dry clutch.

The method may further include: determining whether a lock-up condition of the shift clutch is satisfied while increasing the engagement force of the shift clutch; and locking up the shift clutch when the lock-up condition of the shift clutch is satisfied.

The lock-up condition of the shift clutch may be satisfied when a difference value between the speed of the driving motor and a speed of an output shaft of the shift clutch is less than a second predetermined value.

An apparatus for controlling a hybrid electric vehicle according to an exemplary form of the present disclosure may include: an engine clutch disposed between an engine and a driving motor; a dual clutch transmission (DCT) including a shift clutch; a data detector configured to detect data for controlling the hybrid electric vehicle; and a controller configured to control the engine clutch and the shift clutch based on the detected data, wherein the controller is configured to determine whether an engine start condition is satisfied in a state in which the engine is stopped, to determine whether a slip control entry condition of the shift clutch is satisfied when the engine start condition is satisfied, to increase a speed of the driving motor by slipping the shift clutch when the slip control entry condition is satisfied, to lock up the engine clutch when a lock-up condition of the engine clutch is satisfied while increasing the speed of the driving motor, and to increase engagement force of the shift clutch when the engine clutch is locked up.

The slip control entry condition may be satisfied when a position value of an accelerator pedal is greater than a predetermined position value and a state of charge (SOC) of a battery is less than a predetermined SOC.

The slip control entry condition may be satisfied when a position value of an accelerator pedal is greater than a predetermined position value and a temperature of a battery is less than a predetermined temperature.

The slip control entry condition may be satisfied when a position value of an accelerator pedal is greater than a predetermined position value and a gradient of a road is greater than a predetermined gradient.

The controller may determine a slip amount of the shift clutch based on a position value of an accelerator pedal.

The lock-up condition of the engine clutch may be satisfied when a difference value between a speed of the engine and the speed of the driving motor is less than a first predetermined value.

The engine clutch may be a dry clutch.

The controller may determine whether a lock-up condition of the shift clutch is satisfied while increasing the engagement of the shift clutch, and may lock up the shift clutch when the lock-up condition of the shift clutch is satisfied.

The lock-up condition of the shift clutch may be satisfied when a difference value between the speed of the driving motor and a speed of an output shaft of the shift clutch is less than a second predetermined value.

According to an exemplary form of the present disclosure, when a mode of the hybrid electric vehicle is switched from an electric vehicle (EV) mode to a hybrid electric vehicle (HEV) mode and torque of a driving motor is insufficient, a time desired to engage an engine clutch and engagement shock may be reduced by using slip control of a shift clutch. In addition, a dry clutch may be used as an engine clutch, thereby improving fuel efficiency of a hybrid electric vehicle. Further, since torque of an engine may be transmitted to a dual clutch transmission at an early stage, acceleration performance and launch performance of the hybrid electric vehicle may be improved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is a flowchart of a method for controlling a hybrid electric vehicle;

DESCRIPTION OF SYMBOLS

Figure 1:
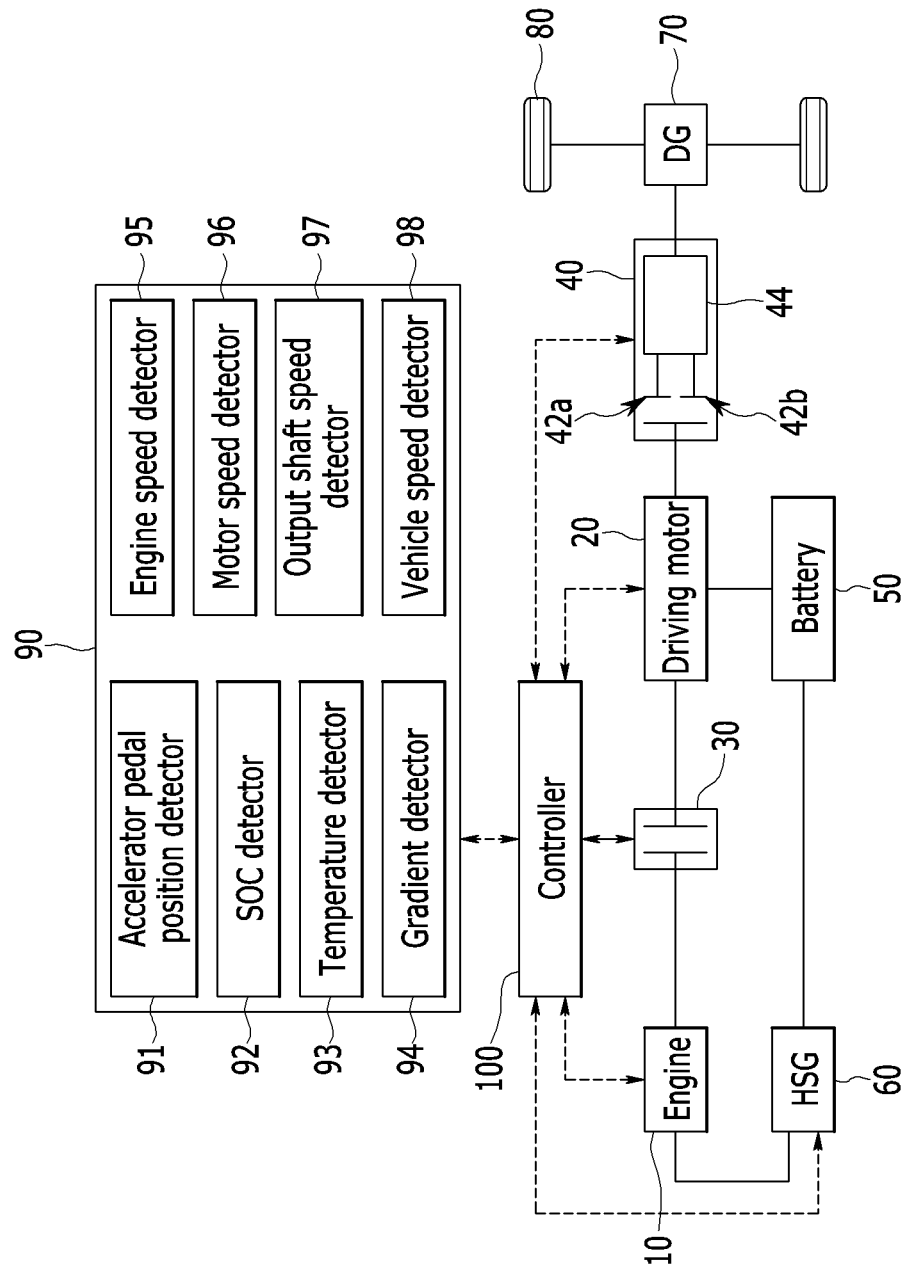
FIG. 1 is a diagram of a hybrid electric vehicle.
Figure 3A:
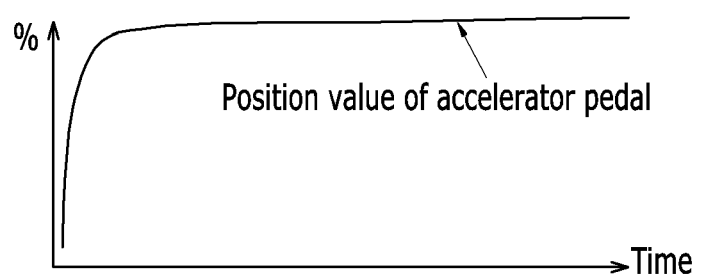
FIG. 3A is a graph illustrating a position value of an accelerator pedal over time.
Figure 3B:
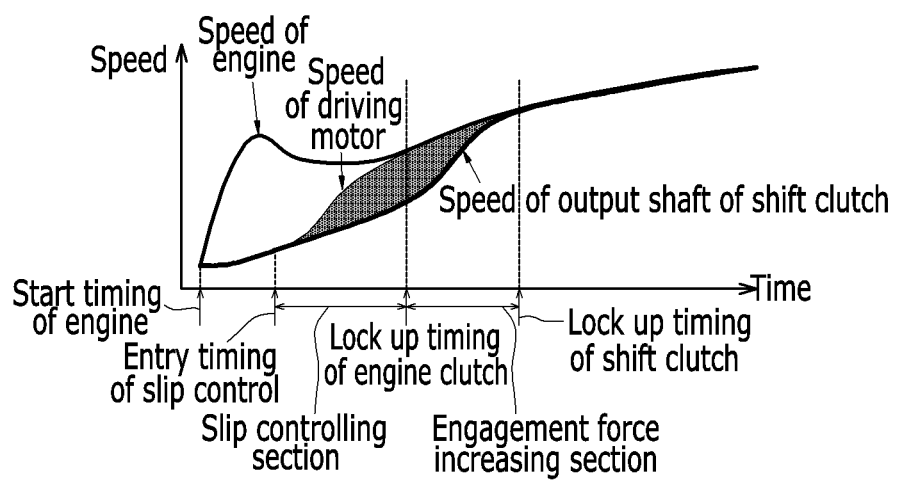
FIG. 3B is a graph illustrating a speed of engine, a speed of a driving motor, and a speed of an output shaft of a shift clutch over time
Figure 3C:
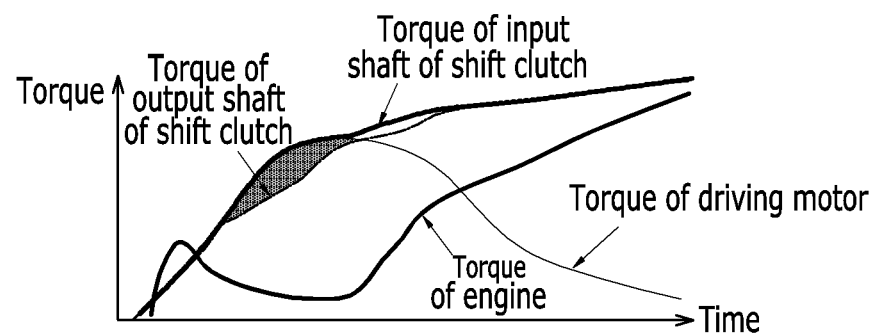
FIG. 3C is a graph illustrating torque of an output shaft of a shift clutch, torque of an input shaft of the shift clutch, torque of an engine, and torque of a driving motor over time.
Figure 3D:
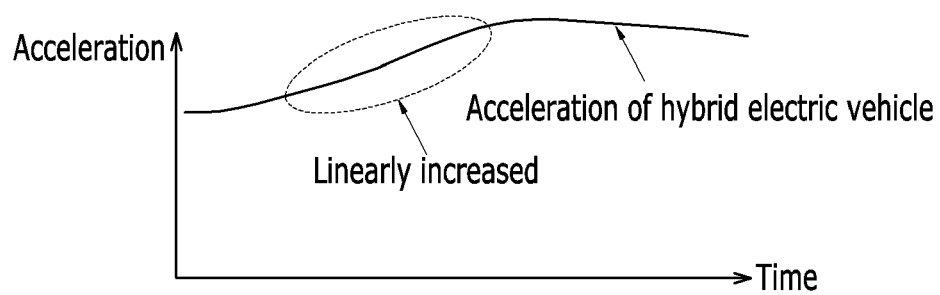
FIG. 3D is a graph illustrating acceleration of a hybrid electric vehicle over time.

10: engine
20: driving motor
30: engine clutch
40: dual clutch transmission
50: battery
60: HSG
70: differential gear device
80: wheel
90: data detector
100: controller The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In addition, each configuration illustrated in the drawings is arbitrarily shown for better understanding and ease of description, but the present disclosure is not limited thereto.

As shown in FIG. 1, a hybrid electric vehicle according to an exemplary form of the present disclosure includes: an engine 10; a driving motor 20; an engine clutch 30 selectively connecting the engine 10 to the driving motor 20; a dual clutch transmission (DCT) 40; a battery 50; a hybrid starter & generator (HSG) 60; a differential gear device 70; a wheel 80; a data detector 90; and a controller 100.

The engine 10 combusts a fuel to generate torque, and various engines such as a gasoline engine, a diesel engine, and a liquefied petroleum injection (LPI) engine may be used as the engine 10.

For torque transmission of the hybrid electric vehicle, torque generated by the engine 10 and/or the driving motor 20 is transmitted to an input shaft of the DCT 40, and torque output from an output shaft of the DCT 40 is transmitted to an axle via the differential gear device 70. The axle rotates the wheel 80 such that the hybrid electric vehicle runs by the torque generated by the engine 10 and/or the driving motor 20.

The hybrid electric vehicle provides driving in an electric vehicle (EV) mode, a hybrid electric vehicle (HEV) mode, and a regenerative braking mode. In electric vehicle (EV) mode, only torque of the driving motor 20 is used, and in the hybrid electric vehicle (HEV) mode, torque of the engine 10 is used as main torque and torque of the driving motor 20 is used as auxiliary torque. And in the regenerative braking mode, braking and inertial energy are recovered through electrical power generation of the driving motor 20 during braking of the vehicle or during deceleration of the vehicle by inertia to be charged in the battery 50.

The battery 50 supplies electricity to the driving motor 20 in the EV mode and the HEV mode and is charged with electricity recovered through the driving motor 20 in the regenerative braking mode.

The HSG 60 starts the engine 10 or generates electricity according to output of the engine 10. The HSG may refer to an integrated starter & generator (ISG).

The engine clutch 30 is disposed between the engine 10 and the driving motor 20. An input shaft of the engine clutch 30 is connected to the engine 10, and an output shaft of the engine clutch 30 is connected to the driving motor 20. The engine clutch 30 may be a dry clutch. The dry clutch is inferior to a wet clutch in terms of heat capacity, but is superior to the wet clutch in terms of responsiveness and fuel efficiency.

The DCT 40 includes two shift clutches 42a and 42b and a gear train 44. Since the shift clutches 42a and 42b applied to the DCT 40 are superior to a shift clutch applied to an automatic transmission, slip control may be facilitated. The gear train 44 includes: a first input shaft, a second input shaft, input gears fixedly disposed on the first input shaft to achieve odd-numbered gear stages, input gears fixedly disposed on the second input shaft to achieve even-numbered gear stages, a first output shaft, a second output shaft, speed gears rotatably disposed on the first output shaft, speed gears rotatably disposed on the second output shaft, synchronizers selectively connecting the speed gears to the output shafts, a first output gear fixedly disposed on the first output shaft, and a second output gear fixedly disposed on the second output shaft. The shift clutches 42a and 42b selectively transmit torque of the engine 10 and/or the driving motor 20 to the first input shaft and the second input shaft. Since the configuration of the DCT 40 is well known in the art, a detailed description thereof will be omitted in the present specification. The present disclosure is applied to any dual clutch transmission.

The data detector 90 detects data for controlling the hybrid electric vehicle, and the data detected by the data detector 90 is transmitted to the controller 100.

The data detector 90 may include: an accelerator pedal position detector 91, an SOC detector 92, a temperature detector 93, a gradient detector 94, an engine speed detector 95, a motor speed detector 96, an output shaft speed detector 97, and a vehicle speed detector 98. The data detector 90 may further include detectors (e.g., a brake pedal position detector and so on) for controlling the hybrid electric vehicle.

The accelerator pedal position detector 91 detects a position value of an accelerator pedal (i.e., a pushed degree of the accelerator pedal), and transmits a signal corresponding thereto to the controller 100. When the accelerator pedal is pushed fully, the position value of the accelerator pedal is 100%, and when the accelerator pedal is not pushed at all, the position value of the accelerator pedal is 0%.

The SOC detector 92 detects a state of charge (SOC) of the battery 50, and transmits a signal corresponding thereto to the controller 100. Instead of directly detecting the SOC of the battery 50, a current and a voltage of the battery 50 may be measured to estimate the SOC of the battery 50.

The temperature detector 93 detects a temperature of the battery 50, and transmits a signal corresponding thereto to the controller 100.

The gradient detector 94 detects a gradient of a road on which the hybrid electric vehicle is currently positioned, and transmits a signal corresponding thereto to the controller 100. The gradient detector 94 may be a G-sensor detecting longitudinal acceleration of the hybrid electric vehicle.

The engine speed detector 95 detects a speed of the engine 10, and transmits a signal corresponding thereto to the controller 100.

The motor speed detector 96 detects a speed of the driving motor 10, and transmits a signal corresponding thereto to the controller 100.

The output shaft speed detector 97 detects a speed of an output shaft of the shift clutch that is currently engaged, and transmits a signal corresponding thereto to the controller 100.

The vehicle speed detector 98 detects a speed of the hybrid electric vehicle, and transmits a corresponding signal to the controller 100.

The controller 100 controls switching between the EV mode and the HEV mode based on driving conditions of the hybrid electric vehicle. In addition, the controller 100 controls the engine clutch 30 and the shift clutches 42a and 42b based on data detected by the data detector 90. The controller 100 may be implemented with one or more processors executed by a predetermined program to control the hybrid electric vehicle. The predetermined program may include a series of commands for performing each step included in a method for controlling the hybrid electric vehicle.

Hereinafter, a method for controlling a hybrid electric vehicle will be described in detail with reference to FIGS. 2 to 7.

FIG. 2 is a flowchart of a method for controlling a hybrid electric vehicle according to the present disclosure, FIG. 3 is a graph for explaining a method for controlling a hybrid electric vehicle, and FIGS. 4 to 7 are diagrams illustrating a state of an engine clutch and a state of a shift clutch.

Figure 4:
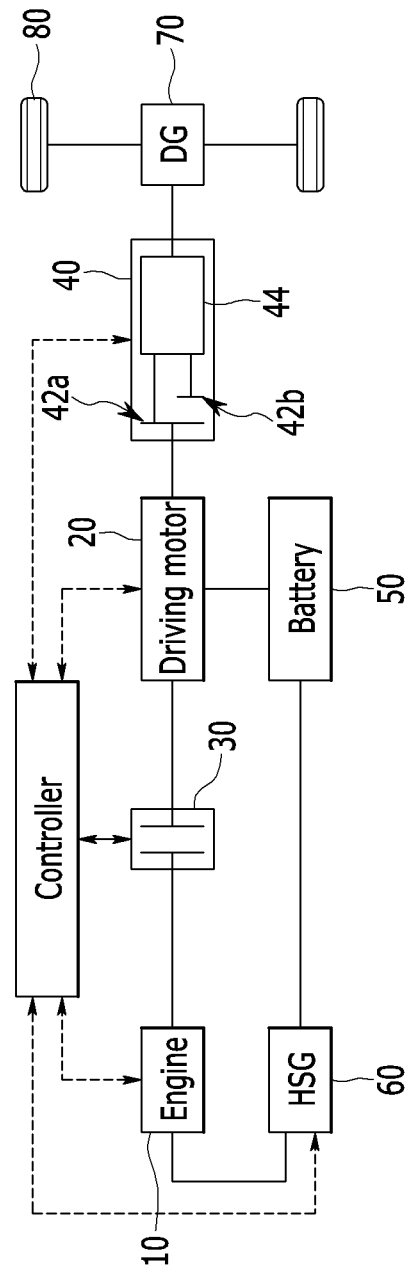
FIGS. 4 to 7 are diagrams illustrating a state of an engine clutch and a state of a shift clutch.

Referring to FIGS. 2 to 7, a method for controlling a hybrid electric vehicle begins with determining whether an engine start condition is satisfied in a state that the engine 10 is stopped at step S100. The engine start condition may include a condition requiring switching from the EV mode to the HEV mode. Hereinafter, the shift clutch 42a will be exemplified as a shift clutch of the DCT 40 that correspond to a current gear stage in the EV mode. As shown in FIG. 4, the engine clutch 30 is in a release state and the shift clutch 42a is in a lock-up state (a state in which the shift clutch is completely engaged) in the EV mode. The engine start condition may be set by taking into consideration the position value of the accelerator pedal, the speed of the hybrid electric vehicle, and the like. For example, the controller 100 may calculate a demand torque of a driver based on the position value of the accelerator pedal and the speed of the hybrid electric vehicle, and the engine start condition may be satisfied when the demand torque of the driver is greater than or equal to a threshold value.

When the engine start condition is not satisfied at step S100, the controller 100 finishes the method for controlling the hybrid electric vehicle. In other words, the engine 10 maintains the stopped state.

When the engine start condition is satisfied at step S100, the controller 100 starts the engine 10 at step S110. In this case, the controller 100 may perform an engine cranking operation by driving the HSG 60 such that the speed of the engine 10 is increased. After that, the controller 100 generates torque of the engine 10 using combustion of the fuel.

When the engine start condition is satisfied, the controller 100 determines whether a slip control entry condition of the shift clutch 42a is satisfied at step S120. The slip control entry condition may be set by taking into consideration the position value of the accelerator pedal, the SOC of the battery 50, the temperature of the battery 50, and the gradient of the road. The slip control entry condition may be satisfied when the position value of the accelerator pedal is greater than a predetermined position value and the SOC of the battery is less than a predetermined SOC. The slip control entry condition may be satisfied when the position value of the accelerator pedal is greater than a predetermined position value and the temperature of the battery 50 is less than a predetermined temperature. The slip control entry condition may be satisfied when the position value of the accelerator pedal is greater than a predetermined position value and the gradient of the road is greater than a predetermined gradient. In other words, when it is difficult for the speed of the driving motor 20 to reach the speed of the engine 10 due to insufficient torque of the driving motor 20, the slip control entry condition may be satisfied.

When the slip control entry condition is not satisfied at step S120, the controller 100 finishes the method for controlling the hybrid electric vehicle. In other words, the shift clutch 42a of the DCT 40 is not slipped.

Figure 5:
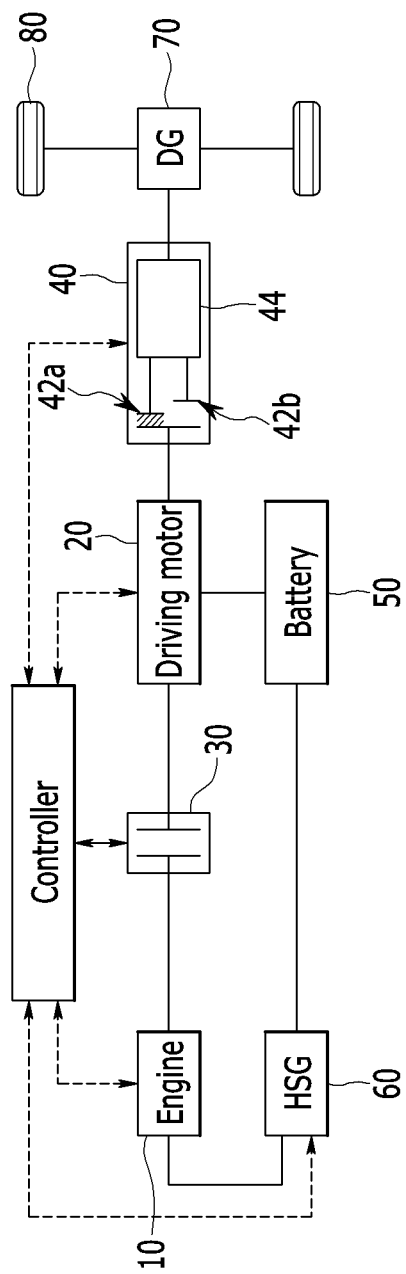

When the slip control entry condition is satisfied at step S120, the controller 100 increases the speed of the driving motor 20 by slipping the shift clutch 42a at step S130. When a state of the shift clutch 42a is changed from the lock-up state to the slip state as shown in FIG. 5, since inertia of the DCT 40 is decreased, the speed of the driving motor 20 is increased. Accordingly, even though torque of the driving motor 20 is insufficient, the speed of the driving motor 20 may be quickly increased. In this case, the controller 100 may determine a slip amount of the shift clutch 42a based on the position value of the accelerator pedal. For example, the controller 100 may determine torque of the input shaft of the shift clutch 42a based on the position value of the accelerator pedal, and may determine the slip amount of the shift clutch 42a by using a map in which the slip amount of the shift clutch 42a depending on torque of the input shaft of the shift clutch 42a is set.

While the speed of the driving motor 20 is increased by the slip of the shift clutch 42a, the controller 100 determines whether a lock-up condition of the engine clutch 30 is satisfied at step S140. The lock-up condition of the engine clutch 30 may be satisfied when a difference value between the speed of the engine 10 and the speed of the driving motor 20 is less than a first predetermined value. The lock-up condition of the engine clutch 30 may be satisfied when a following Equation 1 is satisfied.

$$W_{Engine} - W_{Motor} < W_1 \quad \text{[Equation 1]}$$

Herein, $W_{Engine}$ is the speed of the engine 10, $W_{Motor}$ is the speed of the driving motor 20, and $W_1$ is the first predetermined value. In other words, the lock-up condition of the engine clutch 30 may be satisfied when the speed of the driving motor 20 is synchronized to the speed of the engine 10. The first predetermined value may be set by taking the heat capacity of the engine clutch 30 and the slip of the shift clutch 42a into consideration. As the first predetermined value is greater, the engine clutch 30 may be locked up at an early stage. Because the shift clutch 42 is in the slip state, even though the first predetermined value is a considerably high value, engagement shock of the engine clutch 30 may be reduced. Accordingly, a dry clutch that is inferior to a wet clutch in terms of heat capacity may be used as the engine clutch 30.

When the lock-up condition of the engine clutch 30 is not satisfied at step S140, the controller 100 may return to step S130.

Figure 6:
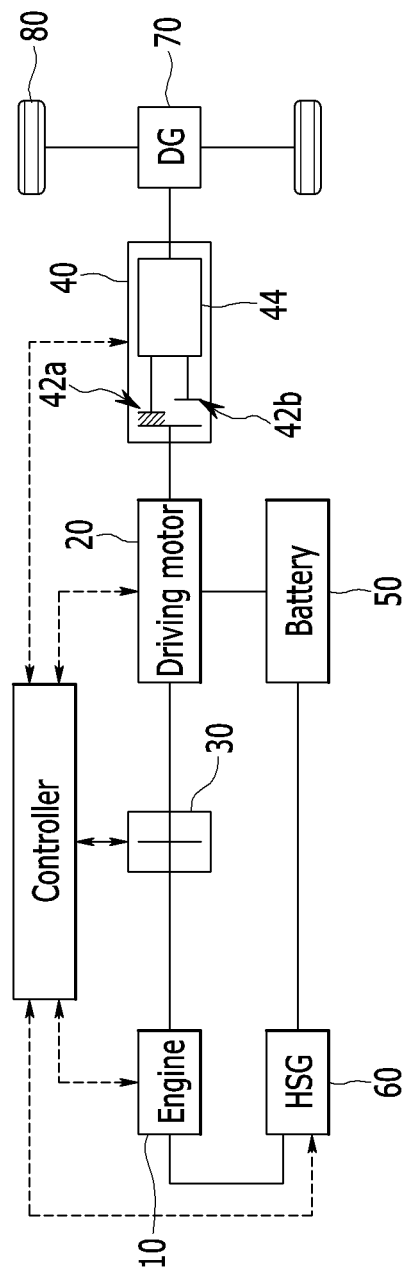

When the lock-up condition of the engine clutch 30 is satisfied at step S140, the controller 100 locks up the engine clutch 30 at step S150. As shown in FIG. 6, when the engine clutch 30 is locked up, the torque of the engine 10 may be transmitted to the DCT 40.

When the engine clutch 30 is locked up, the controller 100 may increase engagement force of the shift clutch 42a at step S160. As a result, the speed of the output shaft of the shift clutch 42a tracks the speed of the driving motor 20.

While increasing the engagement force of the shift clutch 42a, the controller 100 determines whether a lock-up condition of the shift clutch 42a is satisfied at step S170. The lock-up condition of the shift clutch 42a may be satisfied when a difference between the speed of the driving motor 20 and the speed of the output shaft of the shift clutch 42a is less than a second predetermined value. The lock-up condition of the shift clutch 42a may be satisfied when a following Equation 2 is satisfied.

$$W_{Motor} - W_{DCT} < W_2 \quad \text{[Equation 2]}$$

Herein, $W_{Motor}$ is the speed of the driving motor 20, $W_{DCT}$ is the speed of the output shaft of the shift clutch 42a, and $W_2$ is the second predetermined value. In other words, the lock-up condition of the shift clutch 42a may be satisfied when the speed of the output shaft of the shift clutch 42a is synchronized to the speed of the driving motor 20. The second predetermined value may be set by taking the heat capacity of the shift clutch 42a into consideration.

When the lock-up condition of the shift clutch 42a is not satisfied at step S170, the controller 100 may return to step S160.

Figure 7:
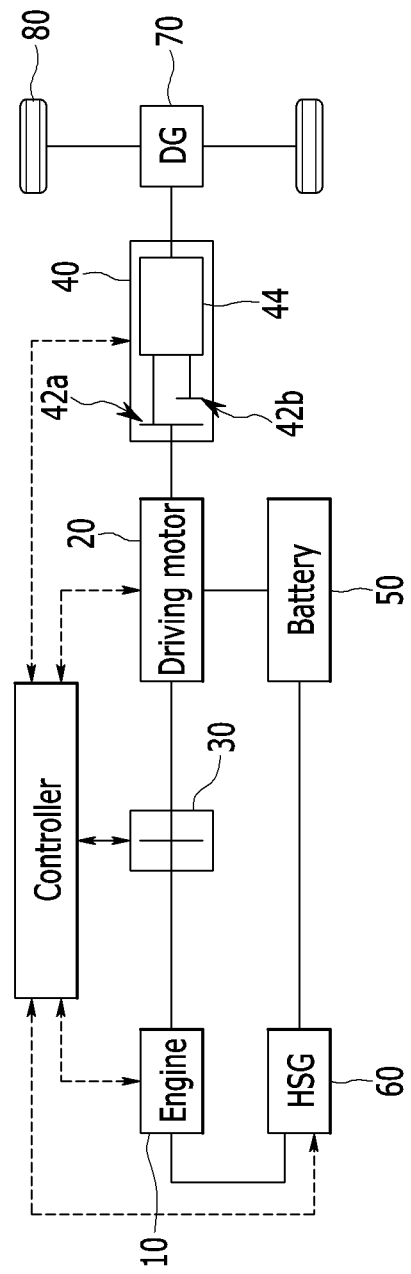

When the lock-up condition of the shift clutch 42a is satisfied at step S170, the controller 100 locks up the shift clutch 42a at step S180. As shown in FIG. 7, when the shift clutch 42a is locked up, the controller 100 may control the engine 10 and/or drive motor 20 to satisfy the demand torque of the driver.

As described above, when the mode of the hybrid electric vehicle is switched from the EV mode to the HEV mode and torque of the driving motor 20 is insufficient, a time desired to engage the engine clutch 30 and engagement shock may be reduced by using the slip control of the shift clutch. In addition, a dry clutch may be used as the engine clutch 30, thereby improving fuel efficiency of the hybrid electric vehicle. Further, since torque of the engine 10 may be transmitted to the DCT 40 at an early stage, acceleration performance and launch performance of the hybrid electric vehicle may be improved.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

What is claimed is:
1. A method for controlling a hybrid electric vehicle including a dual clutch transmission (DCT), comprising:

determining whether an engine start condition is satisfied in a state in which an engine is stopped;

determining whether a slip control entry condition of a shift clutch of the DCT is satisfied when the engine start condition is satisfied;

increasing a speed of a driving motor by slipping the shift clutch when the slip control entry condition is satisfied;

determining whether a lock-up condition of an engine clutch is satisfied while increasing the speed of the driving motor;

locking up the engine clutch when the lock-up condition of the engine clutch is satisfied;

increasing engagement force of the shift clutch when the engine clutch is locked up, determining whether a lock-up condition of the shift clutch is satisfied while increasing the engagement force of the shift clutch; and locking up the shift clutch when the lock-up condition of the shift clutch is satisfied.

2. The method of claim 1, wherein the slip control entry condition is satisfied when a position value of an accelerator pedal is greater than a predetermined position value and a state of charge (SOC) of a battery is less than a predetermined SOC.

3. The method of claim 1, wherein the slip control entry condition is satisfied when a position value of an accelerator pedal is greater than a predetermined position value and a temperature of a battery is less than a predetermined temperature.

4. The method of claim 1, wherein the slip control entry condition is satisfied when a position value of an accelerator pedal is greater than a predetermined position value and a gradient of a road is greater than a predetermined gradient.

5. The method of claim 1, wherein in the increasing of the speed of the driving motor by slipping the shift clutch,
a slip amount of the shift clutch is determined based on a position value of an accelerator pedal.

6. The method of claim 1, wherein the lock-up condition of the engine clutch is satisfied when a difference value between a speed of the engine and the speed of the driving motor is less than a first predetermined value.

7. The method of claim 1, wherein the engine clutch is a dry clutch.

8. The method of claim 1, wherein the lock-up condition of the shift clutch is satisfied when a difference value between the speed of the driving motor and a speed of an output shaft of the shift clutch is less than a second predetermined value.

9. An apparatus for controlling a hybrid electric vehicle, comprising:
an engine clutch disposed between an engine and a driving motor;
a dual clutch transmission (DCT) including a shift clutch;
a data detector configured to detect data for controlling the hybrid electric vehicle; and
a controller configured to control the engine clutch and the shift clutch based on the detected data,
wherein the controller is configured to determine whether an engine start condition is satisfied in a state in which the engine is stopped,
to determine whether a slip control entry condition of the shift clutch is satisfied when the engine start condition is satisfied,
to increase a speed of the driving motor by slipping the shift clutch when the slip control entry condition is satisfied,
to lock up the engine clutch when a lock-up condition of the engine clutch is satisfied while increasing the speed of the driving motor, and
to increase engagement force of the shift clutch when the engine clutch is locked up,
wherein the controller is configured to determine whether a lock-up condition of the shift clutch is satisfied while increasing the engagement of the shift clutch, and
to lock up the shift clutch when the lock-up condition of the shift clutch is satisfied.

10. The apparatus of claim 9, wherein the slip control entry condition is satisfied when a position value of an accelerator pedal is greater than a predetermined position value and a state of charge (SOC) of a battery is less than a predetermined SOC.

11. The apparatus of claim 9, wherein the slip control entry condition is satisfied when a position value of an accelerator pedal is greater than a predetermined position value and a temperature of a battery is less than a predetermined temperature.

12. The apparatus of claim 9, wherein the slip control entry condition is satisfied when a position value of an accelerator pedal is greater than a predetermined position value and a gradient of a road is greater than a predetermined gradient.

13. The apparatus of claim 9, wherein the controller is configured to determine a slip amount of the shift clutch based on a position value of an accelerator pedal.

14. The apparatus of claim 9, wherein the lock-up condition of the engine clutch is satisfied when a difference value between a speed of the engine and the speed of the driving motor is less than a first predetermined value.

15. The apparatus of claim 9, wherein the engine clutch is a dry clutch.

16. The apparatus of claim 9, wherein the lock-up condition of the shift clutch is satisfied when a difference value between the speed of the driving motor and a speed of an output shaft of the shift clutch is less than a second predetermined value.

* * * * *